United States Patent
Lee et al.

(10) Patent No.: US 11,108,270 B2
(45) Date of Patent: Aug. 31, 2021

(54) WIRELESS POWER TRANSMISSION SYSTEM COMMUNICATION PROTOCOL

(71) Applicant: LG ELECTRONICS INC., Seoul (KR)

(72) Inventors: Seonghun Lee, Seoul (KR); Byungsang Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 15/775,269

(22) PCT Filed: Feb. 18, 2016

(86) PCT No.: PCT/KR2016/001651
§ 371 (c)(1),
(2) Date: May 10, 2018

(87) PCT Pub. No.: WO2017/082475
PCT Pub. Date: May 18, 2017

(65) Prior Publication Data
US 2018/0351369 A1    Dec. 6, 2018

Related U.S. Application Data

(60) Provisional application No. 62/253,684, filed on Nov. 11, 2015.

(51) Int. Cl.
*H02J 50/10*    (2016.01)
*H02J 50/80*    (2016.01)
(Continued)

(52) U.S. Cl.
CPC .............. *H02J 50/10* (2016.02); *H02J 5/005* (2013.01); *H02J 7/025* (2013.01); *H02J 50/12* (2016.02); *H02J 50/80* (2016.02); *H04B 5/0037* (2013.01)

(58) Field of Classification Search
CPC ... H02J 50/10; H02J 50/00; H02J 5/00; H05B 6/00; H05B 2213/00; H05B 2206/00; F24C 7/00
(Continued)

(56) References Cited

U.S. PATENT DOCUMENTS

| | | | |
|---|---|---|---|
| 2007/0221668 A1* | 9/2007 | Baarman | H02J 50/80 219/746 |
| 2012/0000903 A1* | 1/2012 | Baarman | H05B 6/062 219/620 |

(Continued)

FOREIGN PATENT DOCUMENTS

| | | |
|---|---|---|
| KR | 10-2012-0102316 A | 9/2012 |
| KR | 10-2015-0051923 A | 5/2015 |

(Continued)

*Primary Examiner* — Hal Kaplan
*Assistant Examiner* — Joseph N Inge
(74) *Attorney, Agent, or Firm* — Birch, Stewart, Kolasch & Birch, LLP

(57) ABSTRACT

A control method for an inductive power supply (IPS), according to one embodiment of the present invention, can comprise the steps of: applying a ping for sensing an object; measuring a coil current; sensing the object on the basis of the coil current measurement result; transmitting, to the object, the minimum power for waking up a communication unit of the object, wherein the communication unit performs communication by using an out-of band communication protocol; receiving, from the object, pairing information through the out-of band communication protocol so as to perform pairing with the object; and transmitting main power to the paired object.

12 Claims, 11 Drawing Sheets

(51) Int. Cl.
  *H04B 5/00* (2006.01)
  *H02J 50/12* (2016.01)
  *H02J 5/00* (2016.01)
  *H02J 7/02* (2016.01)

(58) Field of Classification Search
  USPC .......................................................... 307/104
  See application file for complete search history.

(56) References Cited

U.S. PATENT DOCUMENTS

| | | | |
|---|---|---|---|
| 2012/0235636 A1* | 9/2012 | Partovi | H02J 5/005 |
| | | | 320/108 |
| 2013/0257168 A1* | 10/2013 | Singh | H02J 50/12 |
| | | | 307/104 |
| 2014/0158680 A1* | 6/2014 | Kitaizumi | H05B 6/062 |
| | | | 219/665 |
| 2014/0239732 A1 | 8/2014 | Mach et al. | |
| 2014/0347006 A1* | 11/2014 | Kim | H02J 7/025 |
| | | | 320/108 |

FOREIGN PATENT DOCUMENTS

| KR | 10-2015-0104651 A | 9/2015 |
|---|---|---|
| WO | WO 2013/088238 A2 | 6/2013 |

* cited by examiner

[FIG. 2]
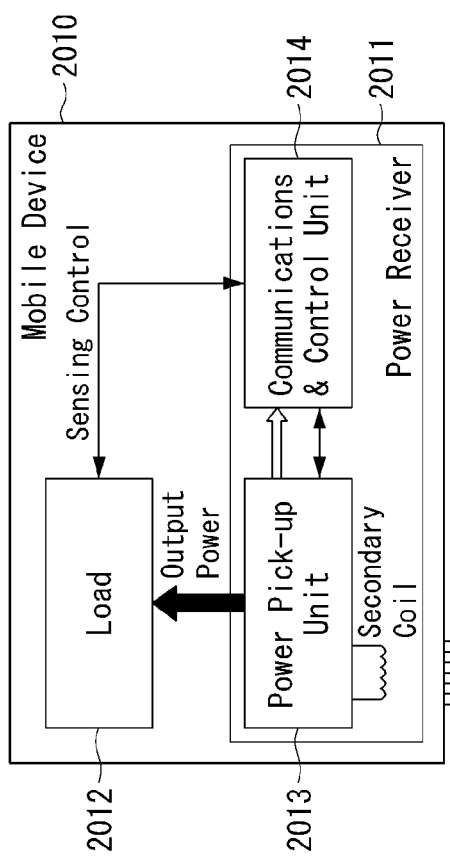
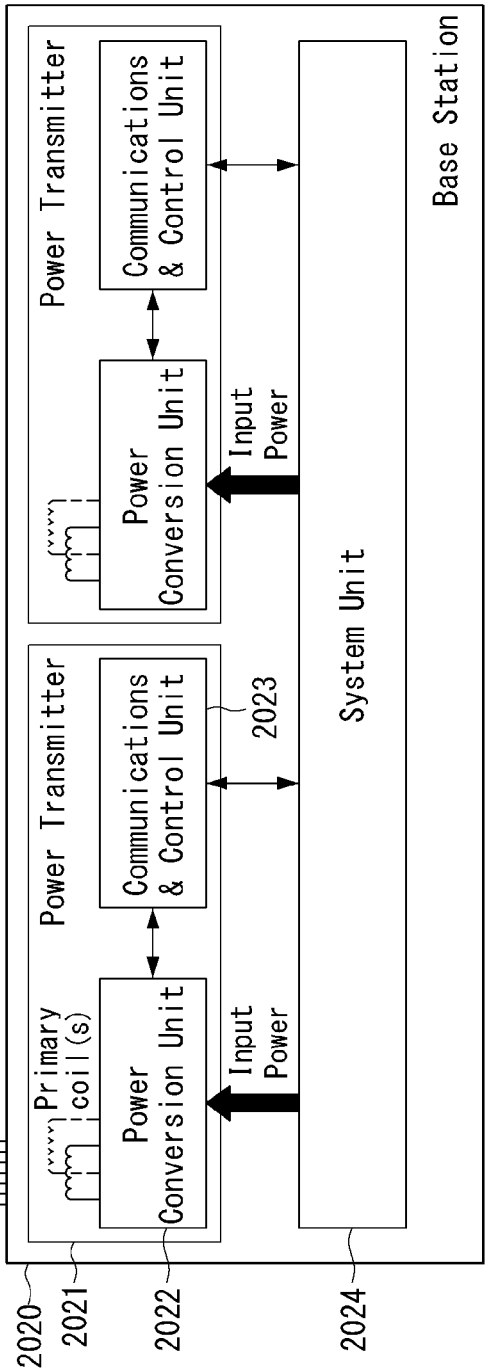

[FIG. 3]
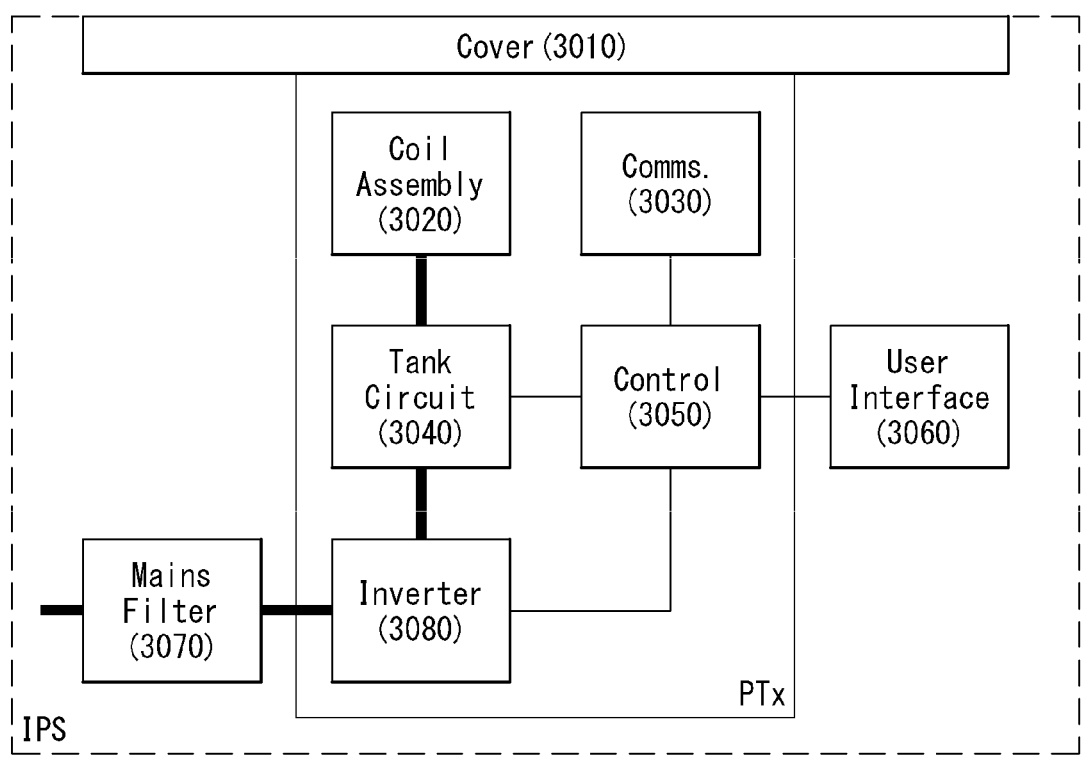

[FIG. 5]
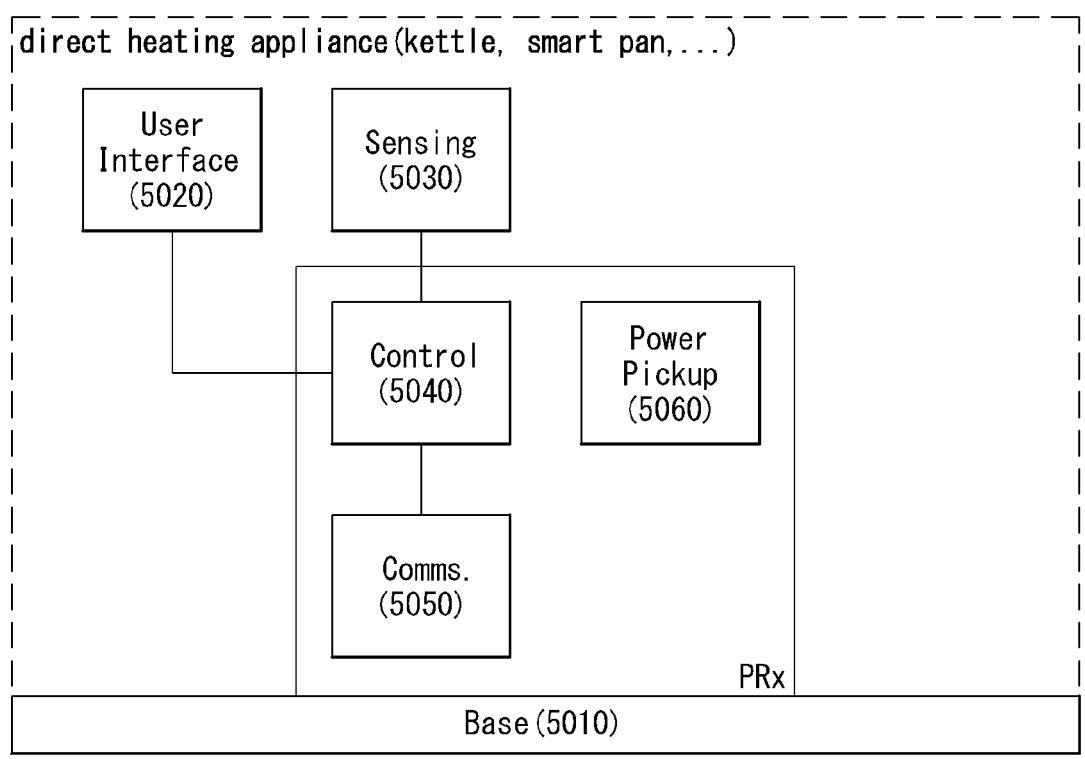

[FIG. 6]

|  |  | Time multiplexed(TM) |  | Out of band(OOB) |
|---|---|---|---|---|
| Bandwidth | − | SUFFICIENT (ABOUT 20 KBITS/S) (CARRIER FREQ. ↑) | + | MORE SUFFICIENT (ABOUT 1MBITS/S) |
| Short range | + | <10cm | − | >30cm |
| Unambiguous | + | THERE IS NO UNAMBIGUOUS PROBLEM DUE TO 1:1 RELATIONSHIP AND POSITION DEPENDENCE | − | THERE IS UNAMBIGUOUS PROBLEM (TIMING AT WHICH POSITION OF HOME APPLIANCE IS CHANGED DURING POWER TRANSMISSION IS VERY IMPORTANT |
| Complexity | − | AUXILIARY COIL FOR COMMUNICATION IS NECESSARY HARDWARE COMPLEXITY INCREASES | + | AUXILIARY COIL FOR COMMUNICATION IS NOT NECESSARY ONLY OOB IC IS ADDED HARDWARE COMPLEXITY DECREASES |
| Regulatory | ? | REGULATION OF EACH COUNTRY IS REQUIRED TO BE CHECKED. CURRENTLY, IT CANNOT BE APPLIED IN EUROPE, ETC. | + | THERE IS NO PROBLEM OF REGULATION |
| Cost of implementation | + | HARDWARE COMPONENT IS NECESSARY TO PROTECT COMMUNICATION CIRCUIT AGAINST HIGH VOLTAGE → INCREASE IN COST | ? | HARDWARE COMPONENT IS NOT NECESSARY → DECREASE IN COST |

[FIG. 7]
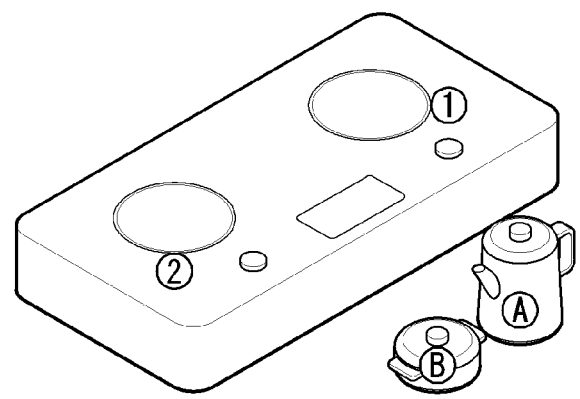
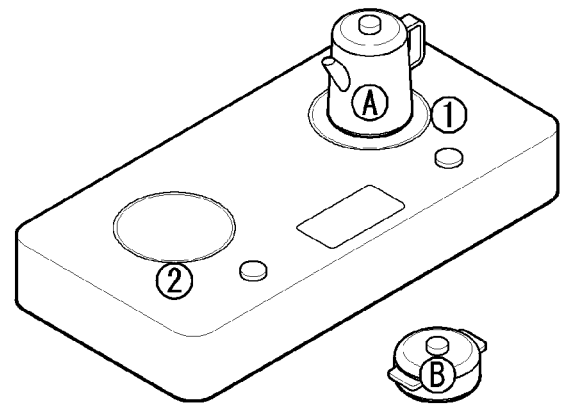
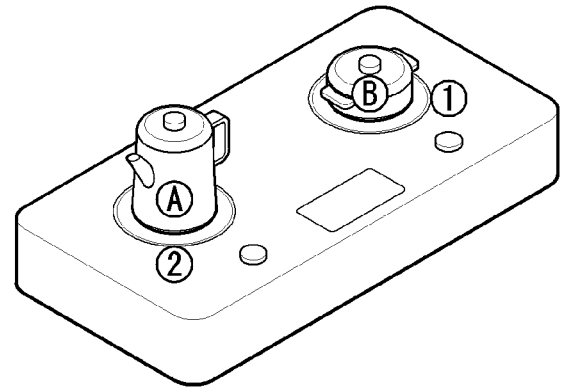

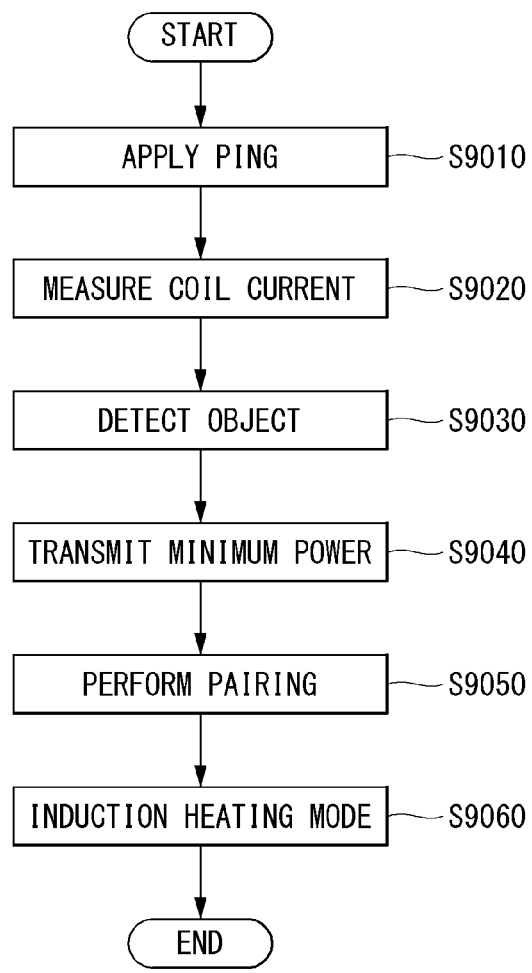

[FIG. 10]
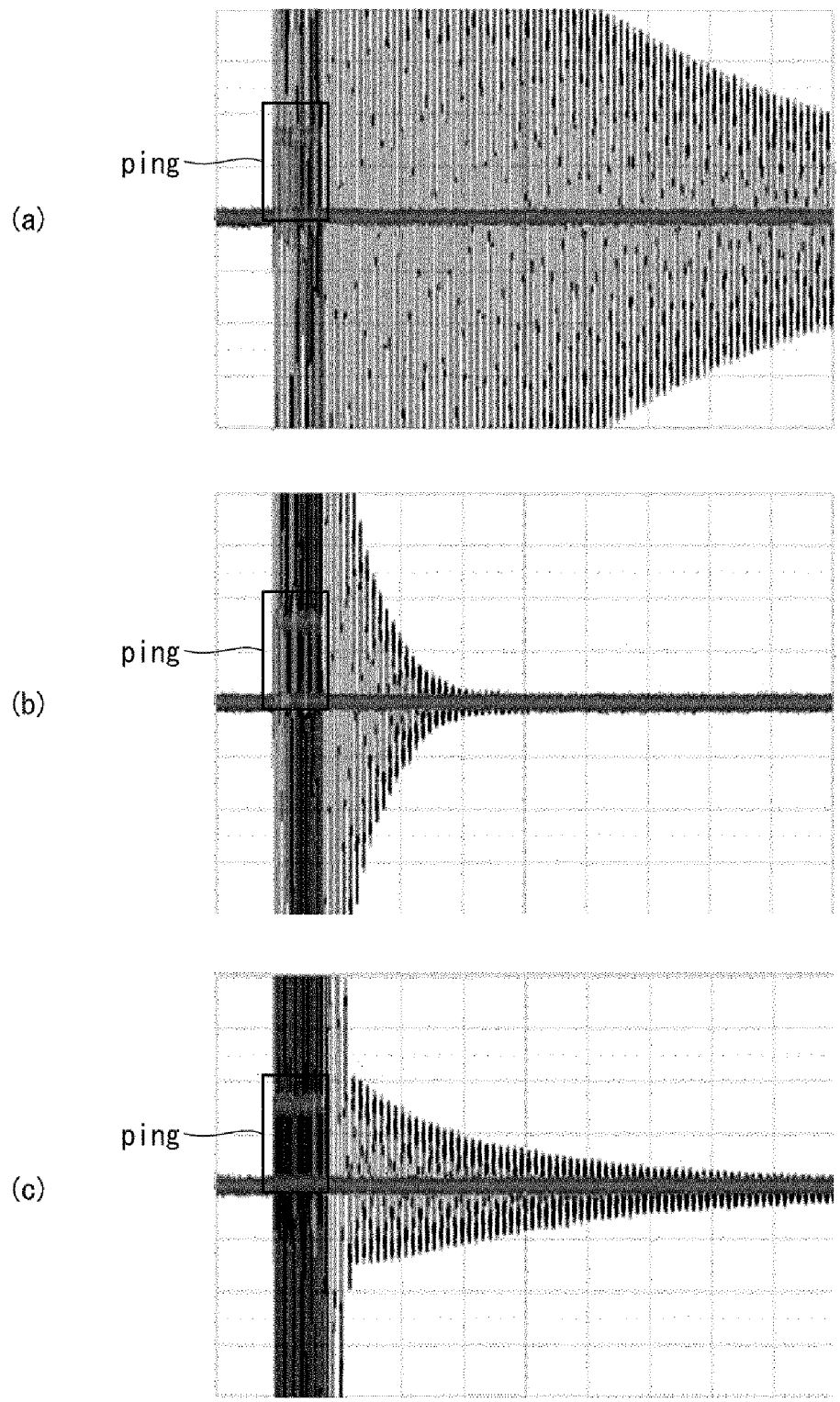

[FIG. 11]
(a) 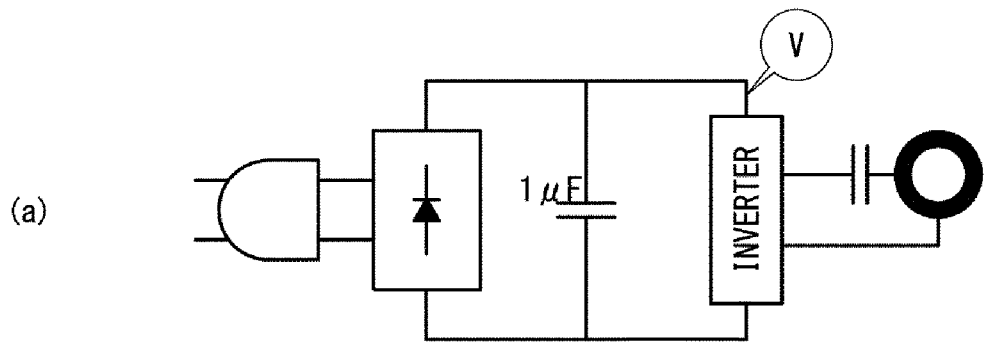
(b) 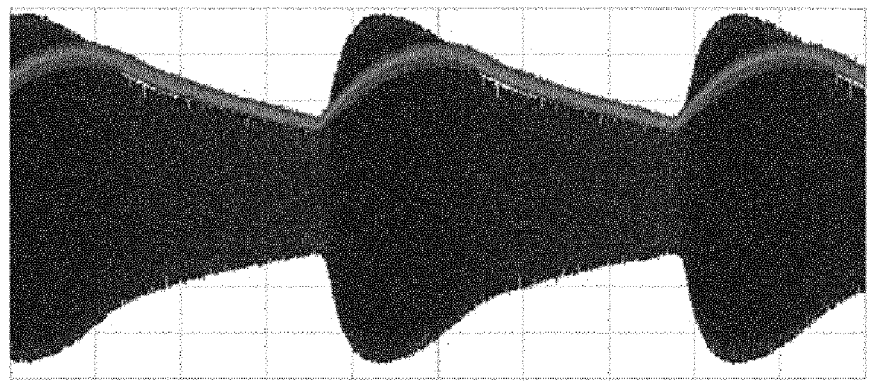
< With 140W Load >
(c) 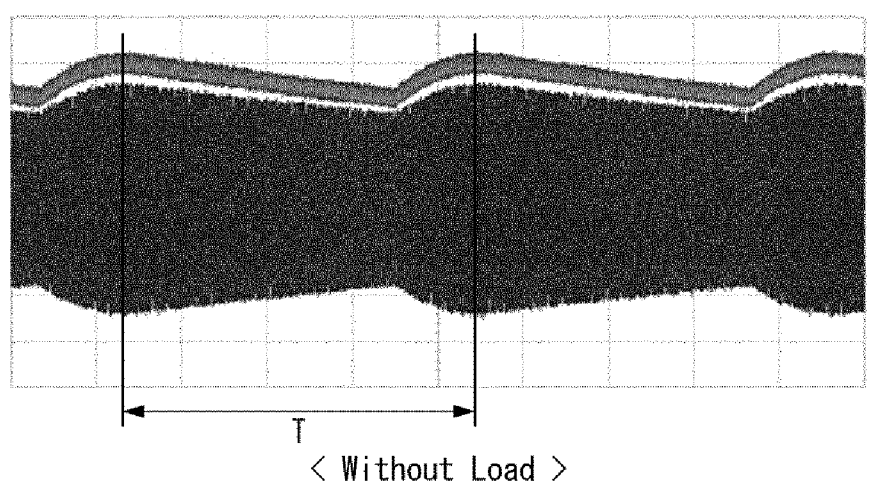
< Without Load >

WIRELESS POWER TRANSMISSION SYSTEM COMMUNICATION PROTOCOL

CROSS REFERENCE TO RELATED APPLICATIONS

This application is the National Phase of PCT International Application No. PCT/KR2016/001651, filed on Feb. 18, 2016, which claims priority under 35 U.S.C. 119(e) to U.S. Provisional Application No. 62/253,684, filed on Nov. 11, 2015, all of which are hereby expressly incorporated by reference into the present application.

TECHNICAL FIELD

The present invention relates to a communication protocol method of a wireless power transmission system.

BACKGROUND ART

A contactless wireless power transmission system is an energy transmission system that elecromagnetically transfers energy by eliminating a line such as in a conventional system in which energy is transmitted through a wire and used as a power source of an electronic device. The contactless wireless power transmission system includes an electromagnetic induction method and a resonance method. In the electromagnetic induction method, a power transmission unit generates a magnetic field through a power transmission coil (primary coil) and power is transferred to a reception coil (secondary coil) placed in a position to which a current is induced. In the resonance method, energy is transmitted using a resonance phenomenon between a transmission coil and a reception coil. Here, a system is configured such that a resonance frequency of the primary coil and a resonance frequency of the secondary coil are the same to use resonance mode energy coupling between the coils.

Such a wireless power transmission system may operate in an induction heating mode in which a power receiver is heated and/or an inductive power transfer mode in which the power receiver is induced.

DISCLOSURE

Technical Problem

An aspect of the present invention provides a new communication protocol method applicable to a wireless power transmission system.

Technical Solution

In an aspect, a method for controlling an inductive power supply (IPS) includes: applying a ping to detect an object; measuring a coil current; detecting the object on the basis of a measurement result of the coil current; transmitting minimum power for waking up a communication unit of the object to the object, the communication unit performing communication using an out-of-band (OOB) communication protocol; receiving pairing information from the object through the OOB communication protocol and performing pairing with the object; and transmitting main power to the paired object.

Also, the detecting of the object on the basis of the measurement result of the coil current may include measuring a coil current generated according to application of the ping and obtaining an envelope of the measured coil current; and when a reduction rate of the envelope is equal to or greater than a threshold, detecting the object.

Also, the method may further include: when performing of the pairing with the object fails, providing a selection interface for receiving an input about whether to execute an induction heating mode to heat the object.

Also, the method may further include: when a selection input instructing execution of the induction heating mode is received through the selection interface, operating in the induction heating mode to apply induction heat to the detected object, and when a selection input instructing non-execution of the induction heating mode through the selection interface, re-applying the ping to detect the object.

Also, the method may further include: when a selection input regarding the selection interface is not received for a predetermined time after the selection interface is provided, re-applying the ping to detect the object.

Also, the method may further include: terminating a system power when entering the stage of re-applying the ping from the stage of providing the selection interface is repeated a predetermined number of times or more.

Also, the transmitting of the main power may be measuring the coil current in real time to detect removal of the object at the same time when the main power is transmitted.

Also, the method may further include: detecting removal of the object on the basis of the measurement result of the coil current during transmission of the main power; and stopping transmission of the main power and re-applying the ping to detect the object.

Also, the detecting of removal of the object on the basis of the measurement result of the coil current may include: measuring a coil current generated during transmission of the main power and obtaining an envelope of the measured coil current; and when a reduction rate of the envelope is less than a threshold, detecting removal of the object.

Also, a transmission frequency of the minimum power may be three times or greater than a transmission frequency of the main power.

In another aspect, an inductive power supply (IPS) includes: a coil assembly including at least one primary coil generating a magnetic field; an inverter converting a direct current (DC) signal into an alternating current (AC) signal; a tank circuit providing impedance matching between the inverter and the at least one primary coil; a communication unit performing communication using an out-of-band (OBB) communication protocol; and a control unit controlling power transmission, wherein the control unit is configured to: apply a ping to detect an object, measure a coil current, detect the object on the basis of a measurement result of the coil current, transmit minimum power for waking up the communication unit of the object to the object, receive pairing information from the object through the 00B communication protocol and perform pairing with the object, and transmit main power to the paired object.

Also, when the object is detected on the basis of the measurement result of the coil current, the control unit may measure a coil current generated according to application of the ping, obtain an envelope of the measured coil current, and detect the object when a reduction rate of the envelope is equal to or greater than a threshold.

Also, the IPS may further include a user interface providing various types of information to a user, wherein when performing of the pairing with the object fails, the control unit may provide a selection interface for receiving an input about whether to execute an induction heating mode to heat the object.

Also, when a selection input instructing execution of the induction heating mode is received through the selection interface, the control unit may operate in the induction heating mode to apply induction heat to the detected object, and when a selection input instructing non-execution of the induction heating mode through the selection interface, the control unit may re-apply the ping to detect the object.

Also, when a selection input regarding the selection interface is not received for a predetermined time after the selection interface is provided, the control unit may re-apply the ping to detect the object.

Also, when the operation of re-applying the ping after providing the selection interface is repeated a predetermined number of times or more, the control unit may terminate a system power.

Also, when the main power is transmitted, the control unit may measure the coil current in real time to detect removal of the object at the same time when the main power is transmitted.

Also, the control unit may detect removal of the object on the basis of the measurement result of the coil current during transmission of the main power, stop transmission of the main power, and re-apply the ping to detect the object.

Also, when removal of the object is detected on the basis of the measurement result of the coil current, the control unit may measure a coil current generated during transmission of the main power, obtain an envelope of the measured coil current, and detect removal of the object when a reduction rate of the envelope is less than a threshold.

Also, a transmission frequency of the minimum power may be three times or greater than a transmission frequency of the main power.

Advantageous Effects

According to an embodiment of the present invention, the use of the out-of-band (OOB) communication protocol as a communication protocol used in a wireless power transmission/reception system has an advantageous effect in terms of bandwidth, communication distance, complexity, regulation, and cost, as compared to a power line communication (PLC) protocol.

According to another embodiment of the present invention, since the presence or absence of an object is quickly detected by measuring a coil current, an unambiguous problem that may arise in the case of using the OOB communication protocol may be solved.

Various other effects according to the embodiment of the present invention will be described below in detail.

DESCRIPTION OF DRAWINGS

FIG. 2 is a block diagram of a wireless power transmission/reception system according to an embodiment of the present invention.

FIG. 3 is a block diagram of an inductive power supply (IPS) according to an embodiment of the present invention.

FIG. 5 is a block diagram of a direct heating appliance according to an embodiment of the present invention.

FIG. 6 is a table comparing a power line communication (PLC) protocol and an OOB communication protocol.

FIG. 7 is a view illustrating a case where an uncertainty problem arises in an OOB communication protocol.

FIG. 9 is a flowchart illustrating an operation method of an IPS in a wireless power transmission/reception system.

FIG. 10 shows graphs illustrating results of measurement of a change in current of an internal coil according to a ping transmission of an IPS in an object detection mode.

FIG. 11 shows graphs illustrating results of measurement of a change in current of an internal coil of an IPS according to removal of an object.

BEST MODES

Figure 1:
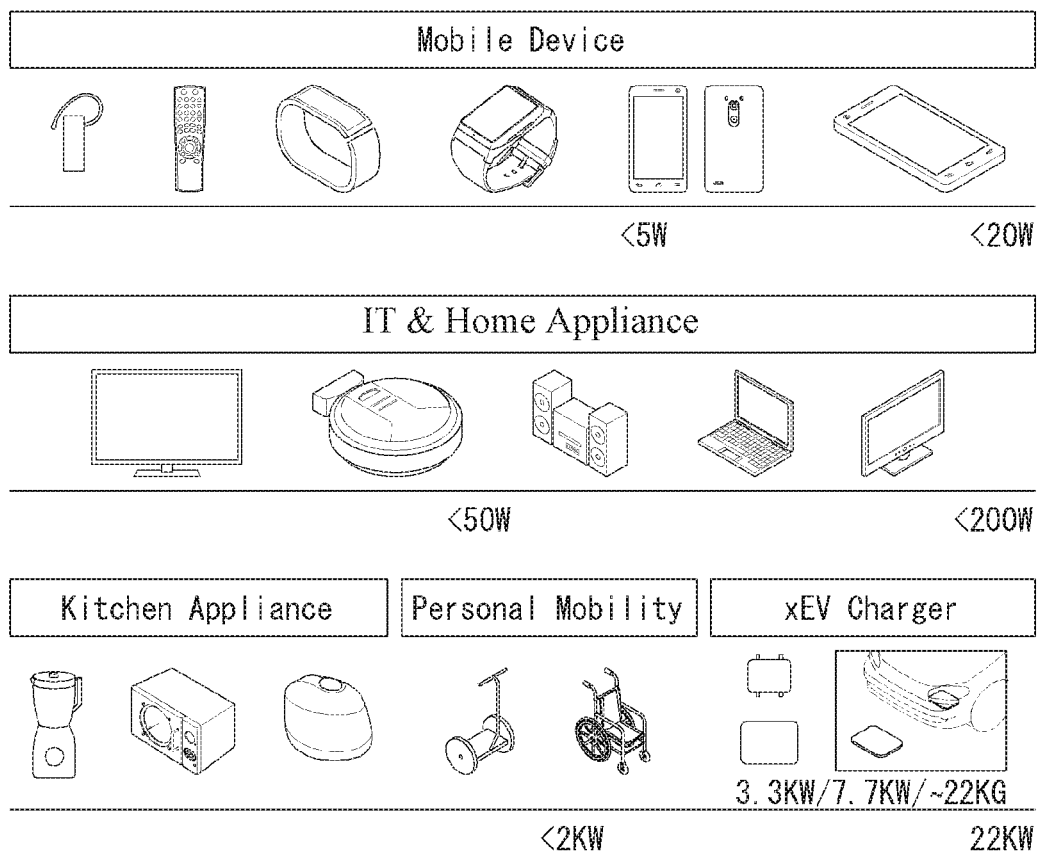
FIG. 1 shows that electronic devices are classified depending on the number of power that is transmitted and received in a wireless charging system.

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

For the standardization of wireless power transmitter/receivers, Wireless Power Consortium (WPC) standardizes technologies related to wireless power transmission/reception.

A recently developed wireless charging system may support the transmission/reception of low power of about 5 W. In this case, there is a problem in that a charging time is long and efficiency is low in such a low power charging method because the size of a mobile device and the capacity of a battery are recently increased. Accordingly, a wireless charging system supporting the transmission/reception of middle power of about 15 W~20 W is developed. Furthermore, in order to improve charging efficiency, a wireless charging system to which a resonant method for simultaneously charging a plurality of electronic devices has been added is developed.

FIG. 1 shows an embodiment of various electronic devices to which a wireless power transmission/reception system is introduced.

In FIG. 1, electronic devices are illustrated to be classified according to the amount of power transmitted and received in the wireless power transmission/reception system.

Referring to FIG. 1, a small power (about 5 W or less or about 20 W or less) wireless charging method may be applied to wearable devices, such as a smart watch, smart glass, a head mounted display (HMD), and a smart ring, and mobile electronic devices (or portable electronic devices), such as an earphone, a remote controller, a smart phone, a PDA, and a tablet PC. A middle power (about 50 W or less or about 200 W or less) wireless charging method may be applied to middle/small-sized home appliances, such as a notebook computer, a robot clearer, TV, audio equipment, and a monitor. A large power (about 2 kW or less or 22 kW or less) wireless charging method may be applied to home appliance, such as a mixer, a microwave, and an electric rice cooker, and personal mobile devices (or electronic devices/mobile means), such as a wheel chair, an electric kickboard, an electric bicycle, and an electric vehicle.

The electronic devices/mobile means described above (or illustrated in FIG. 1) may each include a wireless power receiver as described hereinafter. Thus, the above-described electronic devices/mobile means may be charged upon receiving power wirelessly from a wireless power transmitter.

Hereinafter, a mobile device to which a wireless power charging method is applied will be described, but this is merely an example and the wireless charging method according to the present invention may be applied to various electronic devices as described above.

FIG. 2 is a block diagram of a wireless power transmission/reception system according to an embodiment of the present invention.

Referring to FIG. 2, a wireless power transmission/reception system 2000 includes a mobile device 2010 configured to wirelessly receive power and a base station 2020 configured to wirelessly transfer (or transmit) power. Hereinafter, the mobile device may also be called a "power receiver product", and the base station may also be called a "power transmitter product."

The mobile device 2010 includes a power receiver 2011 for wirelessly receiving power through a secondary coil and a load 2012 for receiving power received by the power receiver 2011, storing the received power, and supplying the stored power to a device.

The power receiver 2011 may include a power pick-up unit 2013 and a communications & control unit 2014. The power pick-up unit 2013 may receive a wireless power signal through the secondary coil and convert the received signal into electric energy. The communications & control unit 2014 may control the transmission/reception of a power signal (or power).

The base station 2020 is a device for providing inductive power or resonant power, and may include at least one power transmitter 2021 or a system unit 2024.

The power transmitter 2021 may send inductive power or resonant power and control such transmission. The power transmitter 2021 may include a power conversion unit 2022 configured to convert electric energy into a power signal by generating a magnetic field through a primary coil(s) and a communications & control unit 2023 configured to control communication and power transfer with the power receiver 2011 so that power of a proper level is transferred. The system unit 2024 may perform control of other operations of the base station 2020, such as input power provisioning, control of a plurality of power transmitters, and control of a user interface.

The power transmitter 2021 may control transmission power by controlling an operating point. The controlled operating point may correspond to a combination of a frequency (or phase), a duty cycle, a duty ratio, and voltage amplitude. The power transmitter 2021 may control transmission power by controlling at least one of a frequency (or phase), a duty cycle, a duty ratio, or voltage amplitude.

Furthermore, the power transmitter 2021 may supply constant power, and the power receiver 2011 may control reception power by controlling a resonant frequency.

Hereinafter, a coil or a coil unit may also be called a coil assembly, a coil cell, or a cell which includes a coil and at least one element close to the coil.

A wireless power transmission/reception system (or a power transmitter and/or receiver) for transmitting wireless power may operate in an inductive power transfer mode, an induction heating (IH) mode, or a combination of the two modes.

In the inductive power transfer mode, a power transmitter 2021 may transmit power (inductive or resonant power) to a power receiver 2011 to charge the power receiver.

In the induction heating mode, the power transmitter 2021 may send power to the power receiver 2011 to heat the power receiver. The principle that the power transmitter 2021 heats the power receiver 2011 is related to a magnetic induction phenomenon. The magnetic induction phenomenon is a phenomenon in which a time-varying magnetic field, a magnetic field which is varied over time, generates an electromotive force in a conductor placed at a suitable location. If the conductor is formed of a sheet of metal, the electromotive force may cause an eddy current to flow in the conductor to heat the conductor. This phenomenon is also well known as an induction heating effect. Recently, various household appliances for home use such as a cooking induction range, an IH pressure cooker, and the like, have been released.

Hereinafter, the power transmission apparatus and the power reception apparatus of the wireless transmission/reception system operating in the induction heating mode and/or the inductive power transfer mode will be described in detail. Hereinafter, the power transmission apparatus may be referred to as an 'inductive power supply (IPS)'.

Hereinafter, the power reception apparatus may be broadly classified as a cordless appliance (or an indirect heating appliance) and a direct heating appliance. The cordless appliance may represent a device that receives power (inductive or resonant power) from the IPS, converts the received power into electrical power and uses the electrical power to drive a motor and/or a heating element. Thus, the cordless appliance may operate in the inductive power transfer (or reception) mode. In addition, the direct heating appliance may represent an appliance in which a flat metal included in a base is directly heated by induction heating. Thus, the direct heating appliance may operate in the inductive power transfer mode and/or the induction heating mode.

FIG. 3 is a block diagram of an IPS according to an embodiment of the present invention.

Referring to FIG. 3, the IPS includes a cover 3010 covering the IPS, a main filter (or a power adapter) 3070 for supplying power to a power transmitter PTx, and a user interface 3060 that provides power transfer progress and other related information. In particular, the user interface 3060 may be optionally included in the IPS or may be included as another user interface of the IPS.

The power transmitter PTx, which is a central element of the IPS, includes a coil assembly 3020, a tank circuit (or impedance matching circuit) 3040, an inverter 3080, a communication unit 3030, and a control unit 3050.

The coil assembly 3020 may include a frame that includes (or carries) a ferrite element as well as at least one coil to produce a magnetic field.

The tank circuit 3040 may include an energy storage capacitor and additional impedance matching elements.

The inverter 3080 may convert a DC input to an AC signal. The inverter 3080 may include a full-bridge topology to support frequency control and duty cycle.

The communication unit 3030 may include a power coil and a separate coil which are concentric, and perform communication with the power receiver PRx by transmitting power using the coils. This configuration provides a spatially localized communication protocol (power line communication (PLC): in-band communication) and ensures (1:1) communication with an appliance to which the IPS provides power. Here, time division multiplexing may be used as a PLC protocol.

However, such a PLC protocol has a problem in that there is a possibility of harm to human bodies during high power transmission and a hardware configuration increases in complexity. Thus, the present disclosure proposes an out-of-band communication (OOB) method as a new communication protocol which may be performed by a communication unit, and details thereof will be described hereinafter with reference to FIGS. 8 to 11.

The control unit 3050 may control the above-described components of the IPS. In particular, the control unit 3050 may control communication and power transfer of the power transmitter PTx. Further, the control unit may include at least one current measurement unit to measure a coil current flowing in an internal coil. In addition, the control unit 3050 may control at least one of the components of the IPS described above to perform various embodiments described in this disclosure.

The above-described components of the IPS may be provided as separate units/devices/chipsets or may be provided as one unit/device/chipset. For example, the communication unit 3030 and the control unit 3050 may be provided as separate devices/chipsets or as a single device/chipset. Further, the above-described components of the IPS may be optionally included or a new component may be added to the IPS.

Figure 4:
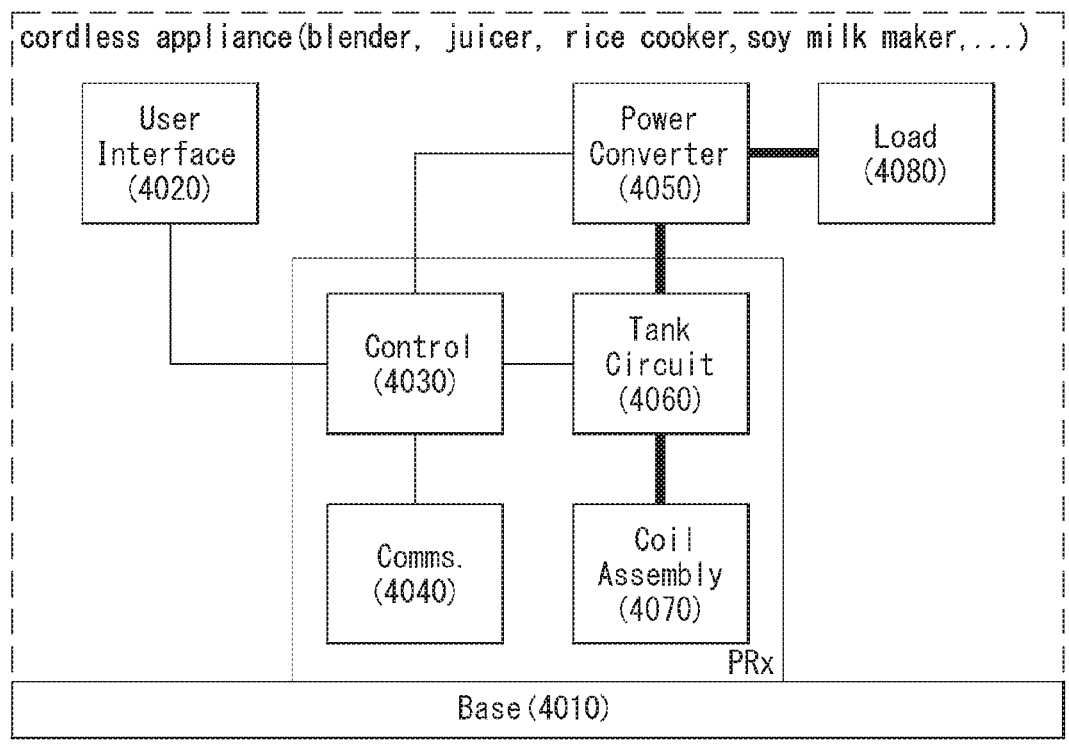
FIG. 4 is a block diagram of a cordless appliance according to an embodiment of the present invention.

FIG. 4 is a block diagram of a cordless appliance according to an embodiment of the present invention. The cordless appliance herein refers to a motorized and/or indirect heating appliance which are wirelessly charged by an IPS, such as a blender, juicer, rice cooker, soy milk maker, and the like.

Referring to FIG. 4, the cordless appliance may include a user interface 4020 that provides power reception progress and other related information, a power receiver PRx that receives wireless power, a load circuit 4080, and a base 4010 that covers or supports the cordless appliance. In particular, the user interface 4020 may optionally be included in the cordless appliance or may be included as another user interface of the cordless appliance.

The power receiver PRx, which is a central element of the cordless appliance, may include a power converter 4050, a tank circuit (or impedance matching circuit) 4060, a coil assembly 4070, a communication unit 4040, and a control unit 4030.

The power converter 4050 may convert AC power received from a secondary coil into a voltage and current suitable for the load circuit. The power converter 4050 may include a rectifier. Here, the rectifier may have a full-wave rectification topology. In addition, the power converter 4050 may adapt reflected impedance of the power receiver PRx.

The tank circuit 4060 may include an energy storage capacitor and additional impedance matching elements.

The coil assembly 3020 may include a frame that includes (or carries) a ferrite element as well as at least one coil to produce a magnetic field.

The communication unit 4040 may include a power coil and a separate coil which are concentric, and perform communication with the power transmitter PTx by transmitting power using the coils. This configuration provides a spatially localized communication protocol (PLC: in-band communication) and ensures communication with the IPS which provides power to the cordless appliance. Details related to the communication unit 4040 are the same as those described above with reference to FIG. 3, and a redundant description will be omitted.

The control unit 4030 may control the above-described components of the cordless appliance. In particular, the control unit 4030 may control communication and power reception of the power receiver PRx. In addition, the control unit 4030 may perform various embodiments described in this disclosure by controlling at least one of the components of the cordless appliances described above.

The components of the cordless appliance described above may be provided as separate units/devices/chipsets or may be provided as one unit/device/chipset. For example, the communication unit 4040 and the control unit 4030 may be provided as separate devices/chipsets or as a single device/chipset. Further, the above-described components of the cordless appliance may be optionally included or a new component may be added to the cordless appliance.

FIG. 5 is a block diagram of a direct heating appliance according to an embodiment of the present invention. In this disclosure, the direct heating appliance represents various home appliances which are directly heated using induction heat, such as a kettle, a coffee pot, a smart fan, and the like.

Referring to FIG. 5, the direct heating appliance may include a user interface 5020 that provides power reception progress and other related information, a power receiver PRx that receives wireless power, a base 5010 that includes a metal material and covers or supports the direct heating appliance, and a sensor unit 5030. In particular, the user interface 5010 may optionally be included in the direct heating appliance or may be included as another user interface of the direct heating appliance.

The power receiver PRx, which is a central element of the direct heating appliance, may include at least one of a power pickup unit 5060, a communication unit 5050, and a control unit 5040.

The power pick-up unit 5060 may drive the direct heating appliance upon receiving power from the IPS.

The communication unit 5050 separately includes a separate coil centered on the power coil, and may communicate with the power transmitter PTx by transmitting power using it. This configuration provides a spatially localized communication protocol (in-band communication) and ensures communication with the IPS providing power to the direct heating appliance. In addition, the detailed description related to the communication unit 5050 is as described above in FIG. 3, and redundant description is omitted.

The sensor unit 5030 may sense and/or monitor a temperature of the direct heating appliance.

The control unit 5040 may control the above-described components of the direct heating appliance. In particular, the control unit 4030 may control communication and power reception of the power receiver PRx. In addition, the control unit 5040 may perform various embodiments described in this disclosure by controlling at least one of the components of the direct heating appliance described above.

The components of the direct heating appliance described above may be provided as separate units/devices/chipsets or may be provided as one unit/device/chipset. For example, the communication unit 5050 and the control unit 5040 may be provided as separate devices/chipsets or as a single device/chipset. Further, the above-described components of the direct heating appliance may be optionally included or a new component may be added to the direct heating appliance.

As described above, the wireless transmission/reception system may perform communication between the power transmitter/receiver using the PLC protocol. However, when the PLC protocol is used, various problems such as a possibility of harm to human bodies, an increase in complexity of a hardware configuration, and the like, may arise. Accordingly, hereinafter, a problem that arises when the PLC protocol is used by comparing the PLC protocol (for example, a time-division multiplex communication method) and the out-of-band (OOB) communication protocol will be discussed, and the use of the OOB communication protocol is proposed as a solution to the problem.

Here, the OOB communication protocol refers to a communication method using a band/channel/network other than a predefined band/channel/network. For example, the OOB communication protocol may include wireless communication protocols such as Bluetooth, Wi-Fi, Wi-Gig, NFC, local RF band, and ZigBee, and the like.

Hereinafter, for the purposes of description, the cordless appliance and the direct heating appliance may be collectively referred to as an "appliance".

FIG. 6 is a table showing a comparison between the PLC protocol and the OOB communication protocol. Hereinafter, advantages and shortcomings of the PLC protocol and the OOB communication protocol are compared with reference to FIG. 6.

(1) Bandwidth

Both the PLC protocol (e.g., time-division communication method) and OOB communication protocol provide a sufficient bandwidth for a transmitter to transmit information. For example, the PLC protocol provides about 20 kbit/s or 100 to 800 kbit/s and the OOB communication protocol provides about 1 Mbit/s. That is, the OOB communication protocol provides a larger bandwidth compared to the PLC protocol.

(2) Short Range

The OOB communication protocol has a short range (communication distance or transmission distance) of three times or more as compared with the PLC protocol. More specifically, a short range of the PLC protocol is about 10 cm or less, and a short range of the OOB communication protocol is about 30 cm or greater. That is, the OOB communication protocol has a longer short range than the PLC protocol. In addition, in the case of the OOB communication protocol, the short range may be adjusted to be shorter by reducing signal strength (that is, to be controlled to operate only at a short short range)

(3) Unambiguous

Unambiguous indicates whether an IPS can recognize a home appliance (or whether the home appliance can recognize the IPS) physically and exactly 1:1 when the appliance is placed in the IPS.

FIG. 7 is a view illustrating a case where an uncertainty problem arises in the 00B communication protocol.

Referring to FIG. 7, household appliance A may be positioned on IPS 1, in which case the household appliance A and the IPS 1 perform communication. Here, it may be assumed that the home appliance A is positioned in IPS 2 and household appliance B is positioned in IPS 1 within a very short time (for example, about 1 second). Here, the IPS 1 may not detect that the household appliance A was removed and the new household appliance B is positioned on the IPS 1 and continue to communicate with the household appliance A. This problem may be referred to as 'uncertainty'. Thus, in order to remove the 'uncertainty' problem, it is required for the IPS to detect the presence and/or removal of the home appliance which has been in the 1:1 communication at a faster rate.

Since the PLC protocol performs position-dependent and physical 1:1 communication between the IPS and the home appliance, there is no problem in uncertainty. More specifically, a communication unit using the PLC protocol is composed of a separate coil which is concentric with a power coil (position dependent). This configuration provides a spatially localized communication method, which ensures 1:1 communication between the IPS and home appliances, so that there is no problem with uncertainty.

However, in the case of using multiple transmission/reception units in an OOB communication protocol, accurate 1:1 communication between the IPS and a home appliance is difficult, and a problem of mixed use of communication may arise. Particularly, in the case of the OOB communication protocol, as illustrated in FIG. 7, the problem of mixed use of communication may arise according to timing at which a position of the home appliance is changed during power transmission of the IPS. Therefore, in order to solve the uncertainty problem of this OOB communication protocol, the present disclosure proposes a method of sensing an envelope of a coil current, which will be described in detail hereinafter with reference to FIGS. 10 and 11.

(4) Complexity

The PLC protocol requires an additional hardware configuration to protect the auxiliary coil and the communication circuit for communication from high voltages. Therefore, the PLC protocol has a disadvantage of high hardware complexity. In contrast, the OOB communication protocol requires only an additional integrated circuit (IC) (i.e., OOB IC) for out-of-band communication, so that it advantageously has a low hardware complexity, as compared with the PLC protocol. However, the OOB communication protocol may software complexity higher than the PLC protocol, for combination of a power control protocol with the OOB communication protocol and pairing between the IPS and a home appliance.

(5) Regulatory

In the case of the wireless power transmission/reception system, regulations may exist in each country due to a safety problem related to harmful effects on human bodies. In the case of the PLC protocol, since communication is performed by transmitting kW class high power, there is a high possibility of harm to human bodies. Therefore, the use of the PLC protocol may be restricted according to countries. Currently, in Europe, the PLC protocol cannot be applied due to regulations. In contrast, the OOB communication protocol is free of regulations because any other wireless communication protocols (e.g., Wi-Fi, BT, ZigBee, local BF band, etc.) which have already been approved may be used instead.

(6) Cost

As described above in relation to complexity, the PLC protocol requires additional hardware components, which may incurs additional cost. However, since the OOB communication protocol requires no additional hardware component, additional cost does not incur.

Table 1 below shows a comparison in required cost between the PLC protocol and the OOB communication protocol.

TABLE 1

| | Time multiplexed | | OOB (Bluetooth) | |
|---|---|---|---|---|
| System | | | | |
| Comm. coil (pair) | $1.0 | Comm. coil (pair) Circuit | 0 | |
| Micom (pair) DC/DC converter Inverter Etc | ~$7.0 (micom $3, Inverter $2, Converter $1, etc $1) | Bluetooth IC (pair) Chip antenna DC/DC converter Etc | ~$6.0 (Bluetooth IC $3, antenna $1, converter $1, etc $1) | |
| Total | $8.0 | | $6.0 | |

Referring to Table 1, in the case of the PLC protocol, an additional hardware component such as a communication auxiliary coil is required, and thus, it costs a total of 8 dollars. In the case of the OOB communication protocol, since only the IC for out-of-band communication is required, it costs a total of 6 dollars, which is less. Therefore, the OOB communication protocol has a more advantageous effect in terms of cost.

As discussed above, the PLC protocols have many problems as compared to the OOB communication protocol in terms of bandwidth, short range, complexity, regulation, and cost. However, the OOB communication protocol has the uncertainty problem (unambiguous). Therefore, The present disclosure proposes the use of the OOB communication protocol as a communication protocol used in the wireless power transmission/reception system, and a method for solving the uncertainty problem will be proposed.

Figure 8:
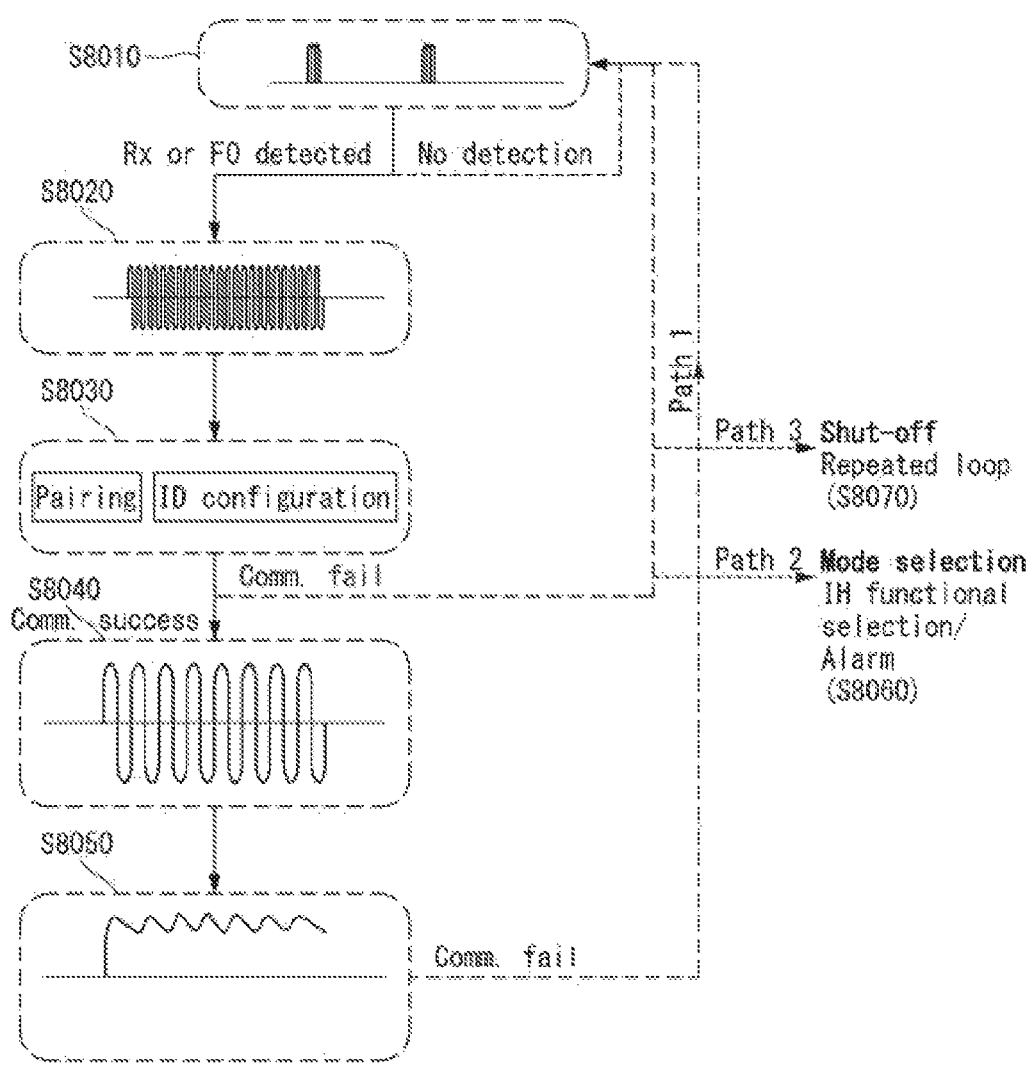
FIG. 8 illustrates an OOB communication protocol according to an embodiment of the present invention.

FIG. 8 illustrates an OOB communication protocol according to an embodiment of the present invention. The pulses illustrated in FIG. 8 represent coil currents flowing in the coils of the IPS over time.

Referring to FIG. 8, first, the IPS may operate in an object detection mode in which an (analog) ping is periodically applied (or transmitted) to detect an object (S1810). For example, the IPS may apply a pulse signal (coil current) within ±2 A to the internal coil at 0.5 second intervals. The IPS may monitor a change in an envelope of a coil current flowing in a coil thereof according to the analog ping transmission to detect whether an object (e.g., foreign object (FO), cordless appliance and/or direct heating appliance) is positioned at a predetermined point of the IPS. Here, the predetermined point may refer to a specific position of the IPS where the object is to be positioned for wireless power reception or induction heating. A more detailed description of an embodiment in which the IPS detects the presence of an object according to a change in an envelope of a coil current will be described in detail with reference to FIG. 10 hereinafter.

If an object is detected according to the ping transmission, the IPS may perform step S8020 as a next step. If an object is not detected, the step S8010 may be repeatedly performed.

When an object is detected, the IPS may operate in a low power transmission mode (or idle mode) to wake up (or activate) a main control unit (MCU) and/or an OOB IC (or communication unit) of the object (S8020). Here, the low power transmission mode refers to a mode in which minimum power that may be able to operate the MCU and/or OOB IC of the object. Here, the IPS may transmit the minimum power at a frequency about three times or greater that of a main power transmission frequency.

Next, the object in which the MCU and/or the OOB IC wakes up upon receiving the low power from the IPS may transmit a packet including information of the object (e.g., ID information of the object) and pairing information to the IPS using the OOB communication protocol (S8030). Here, the pairing information may indicate various pieces of information required for performing the pairing between the IPS and the object.

If the pairing between the IPS and the object is successfully completed, the IPS may operate in an inductive power transfer mode for transmitting main power to the object (S8040). In this case, the IPS and the object may exchange packets including information (e.g., main power transmission duration, strength of main power transmission etc.) for stably performing the main power transmission, using the OOB communication protocol.

When the object is removed (or communication with the object fails) during the main power transmission of the IPS, the IPS may stop the main power transmission and stop performing communication through the OOB communication protocol and return to step S8010 (step S8050) (Path 1). Here, the IPS may detect removal of the object within a short time by monitoring a change in the envelope of the coil current flowing in the coil thereof, and details thereof will be described with reference to FIG. 11 hereinafter. Here, removal of the object may refer to a case where the object placed at the predetermined point for wireless power reception moves to another position.

If performing of step S8030 fails (that is, if pairing between the IPS and the object is not successfully completed), the IPS may enter a mode selection step (S8060). Failure in step S8030 may be refer to a case where a metal foreign object which is not possible to receive wireless power is placed at the predetermined point of the IPS or a case where a direct heating appliance formed of a metal and not having the OOB IC, such as an IH pot, is placed at the predetermined point of the IPS. Thus, the IPS may provide a user with a selection interface that inquires whether to operate the IPS in the object detection mode or the induction heating mode.

The IPS may receive a selection of any one mode from the user through the selection interface and operate in the corresponding mode. For example, if selection of the induction heating mode is received from the user, the IPS may operate in an induction heating mode that heats the object (or directly increases a temperature of a metal in the object). Conversely, if selection of a material detection mode is received from the user, the IPS may again operate in a material detection mode that detects the object by periodically transmitting the analog ping again. If the user's selection input to the selection interface is not received for a preset time, the IPS may return to step S8010 and operate in the object detection mode even without a separate user selection input.

Also, although not illustrated in the drawing, the IPS operating in the induction heating mode may monitor a change in the envelope of the coil current flowing in the coil thereof as in step S8050 to detect removal of the object which is being induction-heated within a short time, and details thereof will be described with reference to FIG. 11 hereinafter.

If the return from step S8060 to step S8010 is repeated a predetermined number of times or greater, the IPS may deactivate (turn off or terminate) the system power and the communication function to safety of the wireless power transmission/reception system and to prevent unnecessary repetition of the operation of the wireless power transmission/reception system (S8070). Here, the predetermined number of times may be set in the manufacturing process of a manufacturer or may be directly set by the user.

FIG. 9 is a flowchart illustrating a method of operating an IPS in a wireless power transmission/reception system. The above description with reference to FIG. 8 may also be applied to this flowchart in the same manner, and a redundant description will be omitted.

Referring to FIG. 9, first, the IPS may apply a ping to detect an object (S9010). More specifically, the IPS may periodically transmit/apply an analog ping to detect an object.

Next, the IPS may measure the coil current (S9020). More specifically, the IPS may measure the coil current generated as the ping is applied. Here, the IPS may measure the coil current over time and obtain an envelope of the measured coil current. Further, the IPS may detect an object according to the obtained envelope, and details thereof will be described with reference to FIG. 10 hereinafter.

Next, the IPS may detect an object based on the measurement result of the coil current (S9030). More specifically, the IPS may detect an object positioned at a predetermined point to which it may transmit power or induced heat based on the measurement result of the coil current.

Next, the IPS may transmit minimum power for waking up the object (S9040). More specifically, the IPS may transmit the minimum power required for waking up the MCU and/or the communication unit included in the object to the object. Here, a transmission frequency of the transmitted minimum power may be three times or greater a transmission frequency of main power.

Next, the IPS may receive the pairing information from the object and perform pairing with the object (S9050). Here, the IPS may receive the pairing information using the OOB communication protocol.

Next, the IPS may transmit main power to the object which has performed the pairing (S9060).

If the pairing with the object fails in step S9050, the IPS may provide a selection interface for selecting the induction heating mode, and details thereof are the same as those described above with reference to FIG. 8.

FIG. 10 shows graphs illustrating results of measurement of a change in current of the internal coil according to ping transmission of the IPS in the object detection mode. In an experiment to obtain the graph, the IPS outputted a pulse signal (coil current) within ±2 A at intervals of 0.5 seconds as a ping, for which the IPS consumed about 500 mW (which meets ET/1275/2008 standards). In the graphs, the x-axis represents time and the y-axis represents the coil current A.

FIG. 10(a) is a graph illustrating a change in the coil current measured in the internal coil of the IPS according to ping transmission of the IPS when an object is not placed on the IPS (that is, the object is not positioned at the predetermined point of the IPS). FIG. 10(b) is a graph illustrating a change in the coil current measured in the internal coil of the IPS according to ping transmission of the IPS when a metal material (e.g., a metal foreign object or a direct heating appliance (e.g., IH pot) is placed on an IPS as an object. FIG. 10(c) is a graph illustrating a change in the coil current measured in the internal coil of the IPS according to ping transmission of the IPS when a cordless appliance is placed on the IPS as an object.

When the graphs of FIGS. 10(a), 10(b), and 10(c) are compared, it can be seen that the envelopes with and without objects have different characteristics. The case of FIG. 10(a) (an object is not present) has an envelope in which the coil current decreases with time and a decreasing rate is very slow. In contrast, the cases of FIGS. 10(b) and 10(c) (an object is present) has an envelope in which the coil current decreases with time but the decreasing rate is very fast. Therefore, the IPS may determine whether an object is positioned at the currently predetermined point by monitoring the decreasing rate (or time) of the coil current generated according to ping application.

For example, the IPS may measure the reduction rate of the envelop of the coil current detected according to ping application and determine that an object does not exist if the reduction rate is less than a threshold or determined that an object exists if the reduction rate is equal to or greater than the threshold. Alternatively, the IPS may measure a time during which the coil current detected according to ping application reaches a preset magnitude and may determine that an object does not exist if the measurement time is equal to or greater than a threshold or determined that an object exists if the measurement time is less than the threshold. Alternatively, the IPS may measure the coil current when a predetermined time (e.g., about 0.5 seconds) has lapsed since an application of a last ping and determine that an object does not exist if the measured magnitude of the current is equal to or greater than a threshold or determine that an object exists if the measured magnitude of the current is less than the threshold.

Further, the IPS may further detect what kind of object it is using a difference between the graphs of FIGS. 10(b) and 10(c). The envelope of FIG. 10(b) has a form in which the coil current decreases at a rate faster than the envelope of FIG. 10(c). The IPS may immediately determine whether the detected object is a cordless appliance or a metallic object using the difference in envelope. As a result, according to an embodiment, when the IPS detects a metal material, it may directly enter the mode selection step S8060 without separately performing the pairing step S8030 in FIG. 8.

FIG. 11 is graphs illustrating results of measurement of a change in current of the internal coil of the IPS according to removal of an object. More specifically, FIG. 11(a) shows the internal circuit of the IPS, and FIGS. 11(b) and 11(c) are graphs of results of measurement of a coil current at a point 'V' (i.e., a front end of inverter) of FIG. 11(a). In this experiment, a 140 W load was used as an object and the IPS applied power to the object at a frequency (f) of 60 Hz. In these graphs, the x-axis represents time and the y-axis represents coil current A.

Referring to FIGS. 11(b) and 11(c), it can be seen that the envelopes in case where an object to which power is transmitted is present and in case where an object is suddenly removed have different characteristics. More specifically, the changes in the coil current in FIG. 11(b) to FIG. 11(c) reveal that the coil current is suddenly reduced at a fast rate during one cycle (T=1/(2f)=1/(2*60)=approximately 8.33 ms) when the object is suddenly removed. That is, it can be seen that, when the slope of the coil current graph measured during one cycle is suddenly reduced when the object to which the IPS is transmitting power is suddenly removed.

The IPS may detect removal of the object to which power is being transmitted within a very short time of one second by detecting a change in the characteristics of the envelope. For example, the IPS may measure an envelope reduction rate of the coil current detected during main power transmission and, if the reduction rate is less than a threshold, the IPS may determine that the object was removed. Alternatively, the IPS may measure a time during which the coil current detected during main power transmission reaches a predetermined magnitude and, if the measurement time is equal to or greater than a threshold, the IPS may determine that the object was removed. Alternatively, the IPS may measure a coil current after the lapse of a predetermined time (e.g., about 0.5 seconds) during the main power transmission and, if the measured current magnitude is equal to or greater than a threshold, the IPS may determine that the object was removed.

Accordingly, although an object in communication is switched to another object within a short time, the IPS may detect removal of the object more quickly to accurately detect switching to another object. As a result, although the IPS communicates with a home appliance using the 00B communication protocol, the uncertainty problem as described above with reference to FIG. 7 may be easily solved by measuring the coil current.

Although respective drawings are divisionally described for convenience of description, the embodiments described in the respective drawings may be designed so as to be combined to implement a new embodiment. Also, as for the apparatus or device according to the present disclosure, the configuration and method according to the embodiments of the present disclosure described above are not limited in its application, but the entirety or a portion of the embodiments may be selectively combined to be configured into various modifications.

Specific embodiments have been described but the present disclosure is not limited to the specific embodiments and various modifications may be made without departing from the scope of the present invention claimed in the claims, and such modifications should not be individually understood from technical concepts or prospects of the present disclosure.

MODE FOR INVENTION

Various embodiments have been described in the best mode for carrying out the invention.

INDUSTRIAL APPLICABILITY

The present invention may be applied to various wireless charging techniques.

The invention claimed is:

1. A method for controlling an inductive power supply (IPS), the method comprising:
applying a ping to detect an object;
measuring a coil current;
detecting the object based on a measurement result of the coil current;
transmitting minimum power for waking up a communication unit of the object to the object, the communication unit performing communication using an out-of-band (OOB) communication protocol;
receiving pairing information from the object through the OOB communication protocol and performing pairing with the object;
transmitting main power to the paired object; and
when the performing of the pairing with the object fails, providing a selection interface for receiving a selection input about whether to execute an induction heating mode to heat the object,
wherein the detecting of the object based on the measurement result of the coil current includes:
measuring the coil current generated according to application of the ping,
obtaining an envelope of the measured coil current to determine a reduction rate of the coil current,
when the reduction rate of the coil current is equal to or greater than a threshold, determining that the object is detected, and
when the reduction rate of the coil current is smaller than the threshold, determining that the object is removed.

2. The method of claim 1, further comprising:
when the selection input instructing execution of the induction heating mode is received through the selection interface, operating in the induction heating mode to apply induction heat to the detected object; and
when the selection input instructing non-execution of the induction heating mode through the selection interface, re-applying the ping to detect the object.

3. The method of claim 2, further comprising:
when the selection input regarding the selection interface is not received for a predetermined time after the selection interface is provided, re-applying the ping to detect the object.

4. The method of claim 3, further comprising:
terminating a system power when entering a stage of re-applying the ping from a stage of providing the selection interface is repeated a predetermined number of times or more.

5. The method of claim 1, wherein the transmitting of the main power is measuring the coil current in real time to detect removal of the object at the same time when the main power is transmitted.

6. The method of claim 5, further comprising:
detecting removal of the object based on the measurement result of the coil current during transmission of the main power; and
stopping transmission of the main power and re-applying the ping to detect the object.

7. An inductive power supply (IPS) comprising:
a coil assembly including at least one primary coil generating a magnetic field;
an inverter converting a direct current (DC) signal into an alternating current (AC) signal;
a tank circuit providing impedance matching between the inverter and the at least one primary coil;
a communication unit configured to control communication using an out-of-band (OBB) communication protocol; and
a control unit controlling power transmission,
wherein the control unit is configured to:
apply a ping to detect an object and measure a coil current,
detect the object based on a measurement result of the coil current,
transmit minimum power for waking up the communication unit of the object to the object,
receive pairing information from the object through the 00B communication protocol and perform pairing with the object,
transmit main power to the paired object,
when performing of the pairing with the object fails, provide a selection interface for receiving a selection input about whether to execute an induction heating mode to heat the object,
wherein the control unit is further configured to:
measure the coil current generated according to application of the ping,
obtain an envelope of the measured coil current to determine a reduction rate of the coil current,
when the reduction rate of the coil current is equal to or greater than a threshold, determine that the object is detected, and when the reduction rate of the coil current is smaller than the threshold, determine that the object is removed.

8. The IPS of claim 7, wherein the control unit is further configured to:
when the selection input instructing execution of the induction heating mode is received through the selection interface, operate in the induction heating mode to apply induction heat to the detected object, and
when the selection input instructing non-execution of the induction heating mode through the selection interface, re-apply the ping to detect the object.

9. The IPS of claim 8, wherein, when the selection input regarding the selection interface is not received for a predetermined time after the selection interface is provided, the control unit is further configured to re-apply the ping to detect the object.

10. The IPS of claim 9, wherein, when the re-applying the ping after providing the selection interface is repeated a predetermined number of times or more, the control unit is further configured to terminate a system power.

11. The IPS of claim 7, wherein, when the main power is transmitted, the control unit is further configured to measure the coil current in real time to detect removal of the object at the same time when the main power is transmitted.

12. The IPS of claim 11, wherein the control unit is further configured to:
detect removal of the object based on the measurement result of the coil current during transmission of the main power,
stop transmission of the main power, and
re-apply the ping to detect the object.

\* \* \* \* \*